United States Patent [19]

Schulz-Andres et al.

[11] Patent Number: 5,720,373
[45] Date of Patent: Feb. 24, 1998

[54] FRICTION CLUTCH FOR A MOTOR VEHICLE

[75] Inventors: Heiko Schulz-Andres, Reinfeld; Achim Link, Schweinfurt, both of Germany

[73] Assignee: Fichtel & Sachs AG, Schweinfurt, Germany

[21] Appl. No.: 635,640

[22] Filed: Apr. 22, 1996

[30] Foreign Application Priority Data

Apr. 21, 1995 [DE] Germany ............ 195 14 808.8

[51] Int. Cl.⁶ .................................................. F16D 13/64
[52] U.S. Cl. ........................ 192/70.14; 192/70.17; 192/107 R
[58] Field of Search ................ 192/70.17, 70.14, 192/107 R

[56] References Cited

U.S. PATENT DOCUMENTS

| | | | |
|---|---|---|---|
| 1,524,771 | 2/1925 | Wood | 192/70.14 X |
| 1,685,983 | 10/1928 | Church | 192/107 R X |
| 2,016,305 | 10/1935 | Wales | 192/70.14 |
| 2,053,622 | 9/1936 | Manning . | |
| 2,888,119 | 5/1959 | Vissing | 192/70.17 X |
| 3,171,527 | 3/1965 | Ott | 192/107 R X |
| 3,548,988 | 12/1970 | Armstrong | 192/107 R |
| 3,978,955 | 9/1976 | Nagano . | |
| 4,585,096 | 4/1986 | Bok . | |
| 4,645,041 | 2/1987 | Bass | 192/107 R X |
| 4,697,684 | 10/1987 | Maycock et al. | 192/107 R |
| 5,337,870 | 8/1994 | Hays . | |
| 5,358,086 | 10/1994 | Muller et al. . | |

FOREIGN PATENT DOCUMENTS

| | | |
|---|---|---|
| 0153078 | 8/1985 | European Pat. Off. . |
| 0554472 | 8/1993 | European Pat. Off. . |
| 0665388 | 8/1995 | European Pat. Off. . |
| 0479946 | 5/1916 | France . |
| 0495332 | 10/1919 | France . |
| 0497297 | 12/1919 | France . |
| 2356840 | 1/1978 | France . |
| 0542434 | 8/1992 | France . |
| 2302808 | 7/1973 | Germany . |
| 2727565 | 1/1978 | Germany . |

*Primary Examiner*—Rodney H. Bonck
*Attorney, Agent, or Firm*—Nils H. Ljungman and Associates

[57] ABSTRACT

A friction clutch for a motor vehicle in which a friction lining ring can be clamped directly between the centrifugal mass and the pressure plate. In addition, a radially inward extension of the friction lining rang is riveted directly to a carrier which is fastened non-rotationally on a hub, possibly with the interposition of a torsional damping device.

19 Claims, 5 Drawing Sheets

FRICTION CLUTCH FOR A MOTOR VEHICLE

BACKGROUND OF THE INVENTION

1. Field of the Invention

This invention generally relates to a friction clutch for a motor vehicle, including a centrifugal mass, which has a ring-shaped friction surface, and which is effectively connected to the crankshaft of an internal combustion engine. The friction clutch also includes a clutch housing which is fastened to the centrifugal mass, and a pressure plate which is fastened in the clutch housing non-rotationally but so that it can move axially. The pressure plate has a ring-shaped friction surface which essentially axially overlaps or covers the friction surface of the centrifugal mass. The friction clutch also includes a clutch spring to apply an axial force to the pressure plate toward the centrifugal mass, with the interposition of a clutch disc. The clutch disc includes mating friction surfaces, and may also include a torsional damping device.

2. Background Information

A similar friction clutch is described, for example, in German Unexamined Patent Application 23 02 808. In that embodiment, friction lining carriers are located on a component of the clutch disc and are provided on each of two sides with a friction lining ring. The friction lining carrier and the friction lining rings are connected to one another by means of rivets which are located in the vicinity of the friction surfaces between the friction lining rings and the pressure plate or the centrifugal mass. Such a construction consists of a large number of individual parts, and has a relatively high mass moment of inertia due to the presence of two friction lining rings.

European Patent Application 0 554 472 also discloses the use of friction lining rings on clutches in transmissions. The friction lining rings have a friction surface, on which, concentric to the friction surface, there are axially-recessed or offset areas which are provided with openings for the insertion of rivets.

OBJECT OF THE INVENTION

The object of the present invention is to reduce the mass moment of inertia in clutch discs of friction clutches, by employing the simplest and most economical clutch disc or measures possible.

SUMMARY OF THE INVENTION

The present invention teaches that this object can be accomplished by providing a carrier which is non-rotationally connected to the hub, and which carrier extends radially outward from the hub to shortly before the area of the friction surfaces of the centrifugal mass and the pressure plate. There is also a friction lining ring which has two mating friction surfaces, and a material thickness which remains essentially constant over the entire radial extent or width of the friction lining ring. The uniform material thickness of the friction lining ring preferably extends radially inward to an area beyond the friction surfaces of the centrifugal mass and the pressure plate. The friction lining ring is in contact laterally, in this area, with the carrier and is riveted to the carrier. The carrier can be either a separate component, or the carrier can be a part of a torsional damping device in the clutch disc, e.g., a cover plate. The manufacture of the clutch disc is, on one hand, very economical because of the small number of individual parts. On the other hand, the clutch disc is very much lighter in weight than similar conventional devices, primarily at the area of its outer diameter. The weight and diameter dimension of the clutch disc are of importance with regard to the mass moment of inertia. The friction lining ring is also load-bearing over essentially its entire radial extent, because its mating fraction surfaces are without interruptions, while in conventional friction lining rings, such interruptions in the form of rivet openings are unavoidable.

As further taught by the present invention, it is advantageous that the carrier and the friction lining ring have fastening openings for rivets on the same intermediate diameter. In other words, the intermediate diameter is a diameter located between the extreme outer edge of the clutch disc and the area where the carrier is connected to the hub. Each rivet can preferably be in contact, by means of its die head, on the side of the friction lining ring farther from the carrier. Each rivet has a shaft, which extends through the fastening openings in the friction lining ring and carrier, and has its closing head on the side of the carrier farther from the friction lining ring. This arrangement takes into consideration the fact that the die head, which has been pre-manufactured on the rivet, is in direct contact with the surface material of the friction lining ring. In this way, no further relative movements of the die head on the friction lining ring will take place during the riveting process. The closing head is provided or disposed on the outside of the carrier, where the closing head can be properly supported during the riveting process.

In accordance with an additional advantageous embodiment, it is also possible to provide a lining disc or an encircling sheet metal ring on the side of the friction lining ring farther from the carrier. The lining disc or encircling sheet metal ring has fastening openings, which fastening openings correspond to the fastening openings of the friction lining ring. In this configuration, rivets can be installed, through the friction lining ring and through the carrier, in either direction. In other words, the die head of the rivets can contact either the lining disc or the carrier, with the corresponding closing head of the rivets contacting either the carrier or the lining disc, respectively.

The present invention further teaches that the fastening openings in the friction lining ring are preferably realized in the form of slots which are open toward the radial inside of the fraction lining ring. Such a configuration is of particular advantage in the manufacture of the friction lining ring, since these slots can be provided as early as during the molding process, while the friction lining ring is in the mold. The friction lining ring material is therefore not weakened by subsequent operations which result in the removal of friction lining ring material in the formation of the fastening openings.

The present invention also teaches that it is advantageous if the pressure plate and the centrifugal mass have recesses in the vicinity of the rivets for the fastening of the friction lining ring and the carrier. The recesses preferably make a transition at an obtuse angle by means of an inclination or bevel to the friction surfaces of the pressure plate or centrifugal mass. Such an arrangement can assure or guarantee that as the wear to the friction lining ring increases, in the vicinity of its mating friction surfaces, a right-angle step in the friction lining ring will essentially be avoided. A right-angle step would reduce the torque transmission capabilities as a result of a notch effect. A right-angle step would also entail the risk that during the process of releasing the friction clutch, the free movement of the clutch disc could no longer be assured or guaranteed. In other words, and in accordance with one embodiment, since, after wear has occurred to the friction lining ring, a cylindrical shoulder will not be formed in the friction lining ring, the pressure plate and/or clutch disc essentially will not get stuck.

The present invention also teaches that the friction lining ring also has notches which are located peripherally between the fastening openings. The notches extend essentially to the inside diameter of the mating friction surfaces of the friction lining ring. The carrier has arms which proceed or extend essentially radially away from a hub or base body. The location of the arms correspond to the location of the fastening openings on the friction lining rings. The arms also have fastening openings, in the form of rivet holes. At least some of the arms make a transition into a tab. The tab extends tangent to the radially extending arms and in a perpendicular direction away from the arms of the carrier. The tab is bent by means of an approximately U-shaped bent edge. As the tab is bent, a U-shaped opening is created between the opposing sides of the tab. The fastening area of the friction lining ring, which includes the fastening opening, can preferably be disposed within the U-shaped opening in the bent tab. The bent edge of the tab is offset from the essentially radially aligned fastening area of the friction lining ring. However, the bent edge of the tab is also aligned essentially parallel to the radially aligned fastening area of the friction lining ring. The bent tab also has an additional fastening opening for the installation of a rivet which extends or runs through the fastening opening in the friction lining ring and also through the fastening opening in the arm. As a result of this configuration of the carrier, it can be assured or essentially guaranteed that both the die head and the closing head of the fastening rivets will be in contact with a part of the carrier. In other words, intermediate elements of the carrier lie between the rivet heads and the friction lining ring. Thus, a particularly secure and reliable riveted connection can be achieved between the carrier and the friction lining ring, whereby it is not essential to specify the side of the carrier on which the closing head is located.

One aspect of the invention resides broadly in a friction clutch for a motor vehicle, the friction clutch including: a flywheel, the flywheel having an axis of rotation defining an axial direction parallel to the axis of rotation; the flywheel comprising a ring-shaped friction surface; the flywheel friction surface having an inner radius and an outer radius; a clutch housing; a clutch disc; a pressure plate for engaging and disengaging the clutch disc with the flywheel; the pressure plate comprising a ring-shaped friction surface; the pressure plate friction surface having an inner radius and an outer radius; the clutch disc being disposed between the flywheel and the pressure plate; a device for fastening the pressure plate to the clutch housing; a device for engaging the pressure plate and the flywheel with the clutch disc; the clutch disc comprising, a hub; a friction lining ring; a carrier device for connecting the friction lining ring to one of the hub and a torsional damper disposed at the hub; the friction lining ring comprising a first portion; the first portion having a first friction surface; the friction lining ring comprising a second portion adjacent to the first friction surface; the first friction surface having an annular shape; the first friction surface having an inner radius and an outer radius; the inner radius, of the first friction surface, being adjacent to the inner radius, of the flywheel; the outer radius, of the first friction surface, being adjacent to the outer radius, of the flywheel; the first friction surface being substantially in contact with the flywheel friction surface upon engagement of the clutch disc; the friction lining ring comprising a third portion; the third portion having a second friction surface; the second portion also being adjacent to the second friction surface; the second friction surface having an annular shape; the second friction surface having an inner radius and an outer radius; the inner radius, of the second friction surface, being adjacent to the inner radius, of the pressure plate; the outer radius, of the second friction surface, being adjacent to the outer radius, of the pressure plate; the second friction surface being substantially in contact with the pressure plate friction surface upon engagement of the clutch disc; a device for connecting the friction lining ring to the carrier device; the carrier device comprising an inner part and an outer part; the outer part of the carrier device being disposed at a substantially greater distance from the axis of rotation than the inner part of the carrier device; the outer part of the carrier device extending radially outwardly from the hub to shortly before at least one of: the first friction surface of the friction lining ring and the second friction surface of the friction lining ring; the outer radius of the flywheel friction surface being substantially greater than the inner radius of the flywheel friction surface; the outer radius of the pressure plate friction surface being substantially greater than the inner radius of the pressure plate friction surface; the outer radius of the first friction surface being substantially greater than the inner radius of the first friction surface; and the outer radius of the second friction surface being substantially greater than the inner radius of the second friction surface.

Another aspect of the invention resides in a clutch disc for a friction clutch for a motor vehicle, which friction clutch includes: a flywheel; the flywheel comprising a ring-shaped friction surface; the flywheel friction surface having an inner radius and an outer radius; a clutch housing; a clutch disc; a pressure plate for engaging and disengaging the clutch disc with the flywheel; the pressure plate comprising a ring-shaped friction surface; the pressure plate friction surface having an inner radius and an outer radius; the clutch disc being disposed between the flywheel end the pressure plate; a device for fastening the pressure plate to the clutch housing; a device for engaging the pressure plate and the flywheel with the clutch disc; the clutch disc comprising: a hub; a friction lining ring; the clutch disc having an axis of rotation defining an axial direction parallel to the axis of rotation; a carrier device for connecting the friction lining ring to one of the hub and a torsional damper disposed at the hub; the friction lining ring comprising a first portion; the first portion having a first friction surface; the friction lining ring comprising a second portion adjacent to the first friction surface; the first friction surface having an annular shape; the first friction surface having an inner radius and an outer radius; the friction lining ring comprising a third portion; the third portion having a second friction surface; the second portion also being adjacent to the second friction surface; the second friction surface having an annular shape; the second friction surface having an inner radius and an outer radius; a device for connecting the friction lining ring to the carrier device; the carrier device comprising an inner part and an outer part; the outer part of the carrier device being disposed at a substantially greater distance from the axis of rotation than the inner part of the carrier device; the outer part of the carrier device extending radially outwardly from the hub to shortly before at least one of: the first friction surface of the friction lining ring and the second friction surface of the friction lining ring; a very substantial portion of the friction lining ring extends beyond the outer part of the carrier device; the clutch disc being configured such that the carrier device is disposed away from the pressure plate and the flywheel upon installation of the clutch disc; the clutch disc being configured such that the first friction surface of the friction lining ring is adjacent to the flywheel upon installation of the clutch disc; the clutch disc being configured such that the second friction surface of the friction lining ring is adjacent to the pressure plate upon installation of the clutch disc; the outer radius of the first friction surface being substantially greater than the inner radius of the first friction surface; and the outer radius of the second friction surface being substantially greater than the inner radius of the second friction surface.

The above discussed embodiments of the present invention will be described further hereinbelow with reference to the accompanying figures. When the word "invention" is used in this specification, the word "invention" includes "inventions" that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
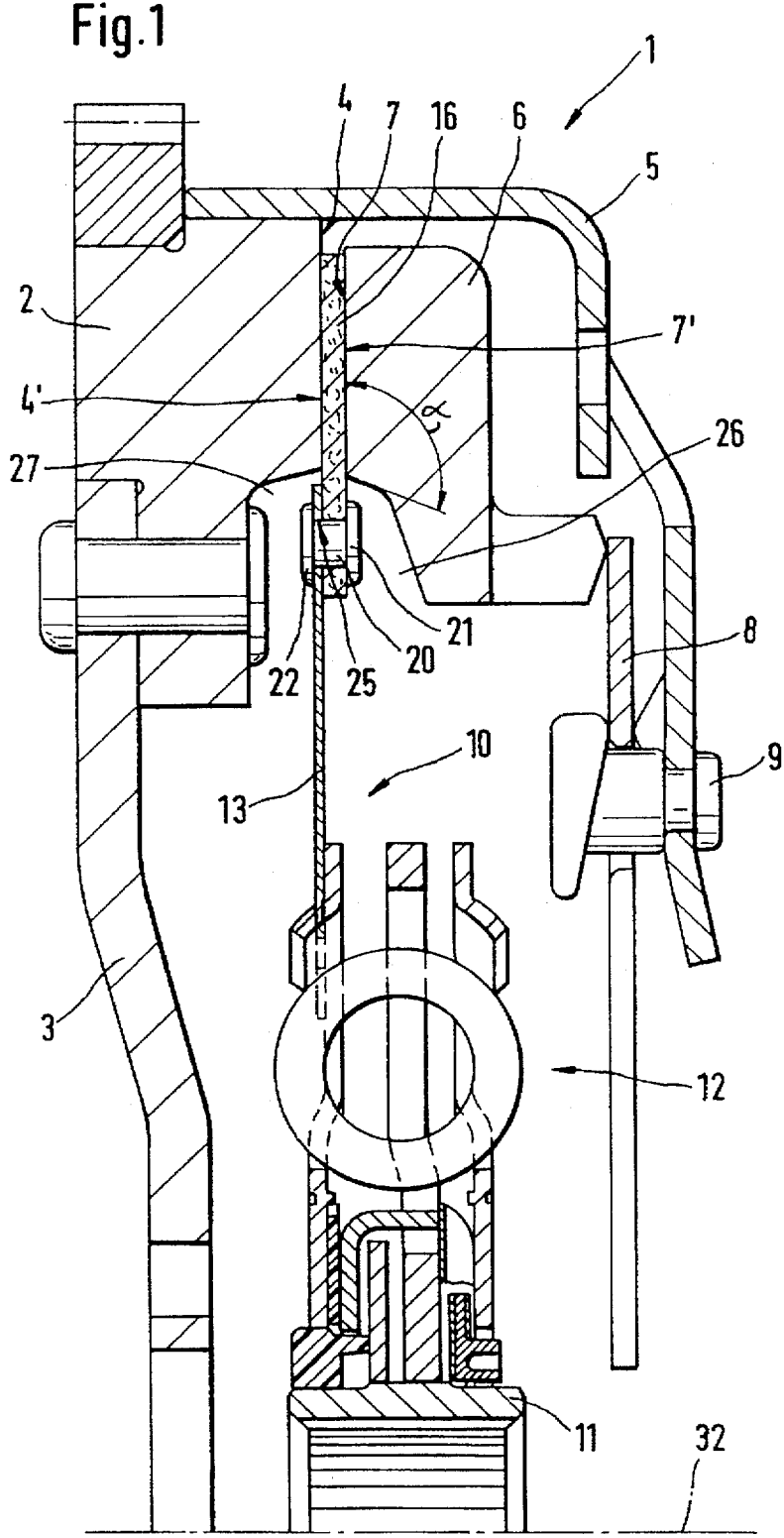
FIG. 1 is a longitudinal section through the upper half of a friction clutch.

FIG. 1 shows the upper half of a longitudinal section through a friction clutch 1. The friction clutch 1 can preferably include a centrifugal mass 2 which is fastened by means of a disc 3 to a crankshaft (not shown) of an internal combustion engine. Fastened to the centrifugal mass 2 is the clutch housing 5, which is bent approximately in the shape of a pot around a pressure plate 6. The pressure plate 6 is spring-loaded or biased by a membrane spring 8 toward the centrifugal mass 2, whereby the membrane spring 8 is mounted by means of spacer bolts 9 so that it can pivot on the clutch housing 5. The friction clutch 1 can also include a clutch disc 10 having a friction lining ring 16, and a hub 11. The pressure plate 6 and the centrifugal mass 2, in the areas which face one another, have ring-shaped friction surfaces 7 and 4 respectively. Between these ring-shaped friction surfaces 4 and 7, when the friction clutch 1 is engaged, the friction lining ring 16 is clamped, which friction lining ring 16 has mating friction surfaces 4' and 7'! opposite the ring-shaped friction surface 4 of the centrifugal mass 2 and the ring-shaped friction surface 7 of the pressure plate 6. In other words, friction surface 4' of the friction lining ring 16, contacts friction surface 4 of the centrifugal mass 2, while friction surface 7' of the friction lining ring 16, contacts friction surface 7 of the pressure plate 6, when the friction clutch 1 is engaged.

Figure 3:
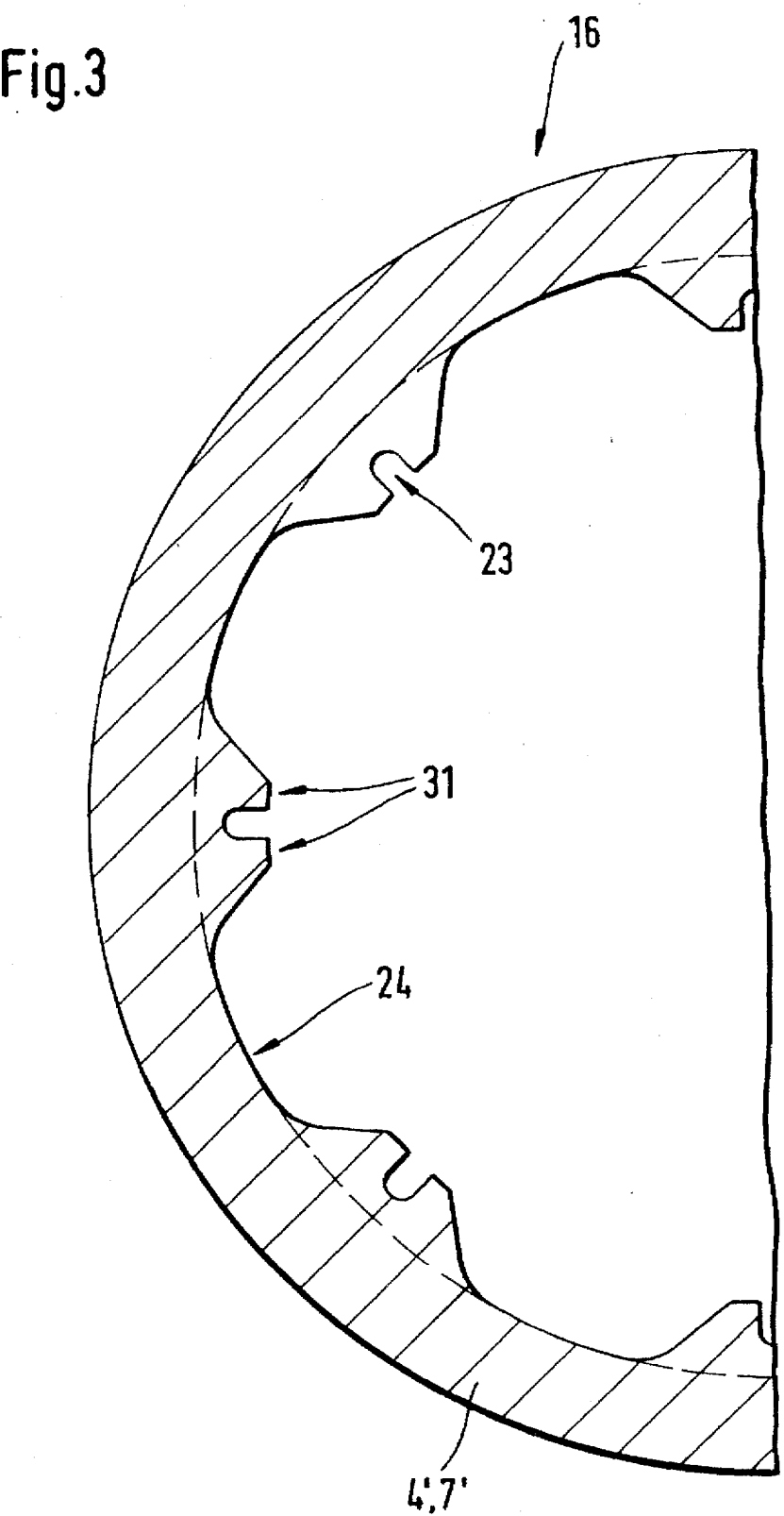
FIG. 3 is a partial view of a friction lining ring.

FIG. 3 shows one possible embodiment of the friction lining ring 16 in a plan view. The friction lining ring 16 can include fastening areas 31, fastening openings 23 and notches 24. The friction lining ring 16 is extended toward the radial inside, beyond the mating friction surfaces 4' and 7', at least into the fastening areas 31, and in this area has the fastening openings 23. These fastening openings 23 can advantageously be realized in the form of slots which are, open toward the radial inside of the friction lining ring 16. Notches 24 can be located peripherally between these fastening areas 31. These notches 24 reduce the weight and therefore the mass moment of inertia of the friction lining ring 16. The friction lining ring 16 is part of the clutch disc 10 which can rotate around a common axis of rotation 32 of the friction clutch 1. The friction lining ring 16 is non-rotationally connected to the hub 11 of the clutch disc 10, whereby a torsional damper 12 can be provided between the friction lining ring 16 and the hub 11. The presence of a torsional damper 12 makes possible a defined relative rotation between the friction lining ring 16 and the hub 11 in opposition to the force applied by a spring device, and possibly of a friction device. In this case, there is a carrier 13 which creates the connection between the torsional damper 12 and the friction lining ring 16, whereby the carrier 13 can also be realized in one piece with a component of the torsional damper 12.

The carrier 13 has a plurality of fastening openings 25 which are distributed on the periphery of the carrier 13. The fastening openings 25 have the same average diameter as the fastening openings 23 in the friction lining ring 16. The connection between the carrier 13 and the friction lining ring is created by means of rivets 20, each of which is introduced from the side of the mating friction surface 7' of the friction lining ring 16, through the fastening opening 23 of the friction lining ring 16, and finally through the fastening opening 25 of the carrier 13, so that the die head 21 is in contact against the outside of the friction lining ring 16. The closing head 22 is formed on the side of the carrier 13 farther from the friction lining ring 16. The result of the connection between the carrier 13 and the friction lining ring 16, is the creation of a type of fastening which makes possible a permanent connection, which takes into consideration the relatively sensitive material characteristics of the friction lining ring 16.

Figure 2:
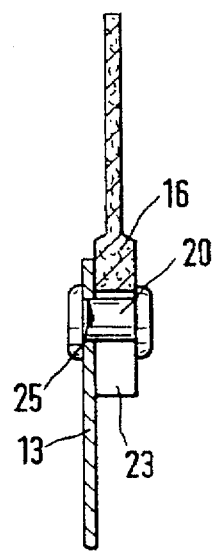
FIG. 2 is a partial section through the clutch disc with a worn friction lining ring.

Both the centrifugal mass 2 and the pressure plate 6, in the vicinity of the transition of the frictional surfaces 4 and 7 toward the radial inside, in the fastening area between the friction lining ring 16 and the carrier 13, are provided with recesses 27 and 26 respectively. The recesses 26 and 27 emerge in the radially inner area of the friction surfaces 7 and 4 respectively, at an obtuse angle (alpha). The configuration, as illustrated in FIG. 2 in particular, results in a high operational reliability of the friction lining ring 16, even when the friction lining ring 16 is worn. FIG. 2 shows a friction lining ring 16 which is already worn, and which is already significantly thinner in the vicinity of the friction surfaces 4' and 7' respectively than in its fastening area. As a result of the configuration of the pressure plate 6 and centrifugal mass 2, a sharp or sudden offset between the worn and unworn areas of the friction lining ring 16 is essentially avoided, so that on one hand, the torque transmission capability can be essentially assured or guaranteed, even with increasing wear, and on the other hand there is essentially no interference with the clutch release process, i.e., the pressure plate 6 or centrifugal mass 2 will not interfere with the movement of the clutch disc 10. As a result of the inclined surfaces of the recesses 26 and 27, there is a bevelled edge in the material of the friction lining ring 16 which does not interfere with the release movements of the pressure plate 6 and of the friction lining ring 16.

Figure 4:
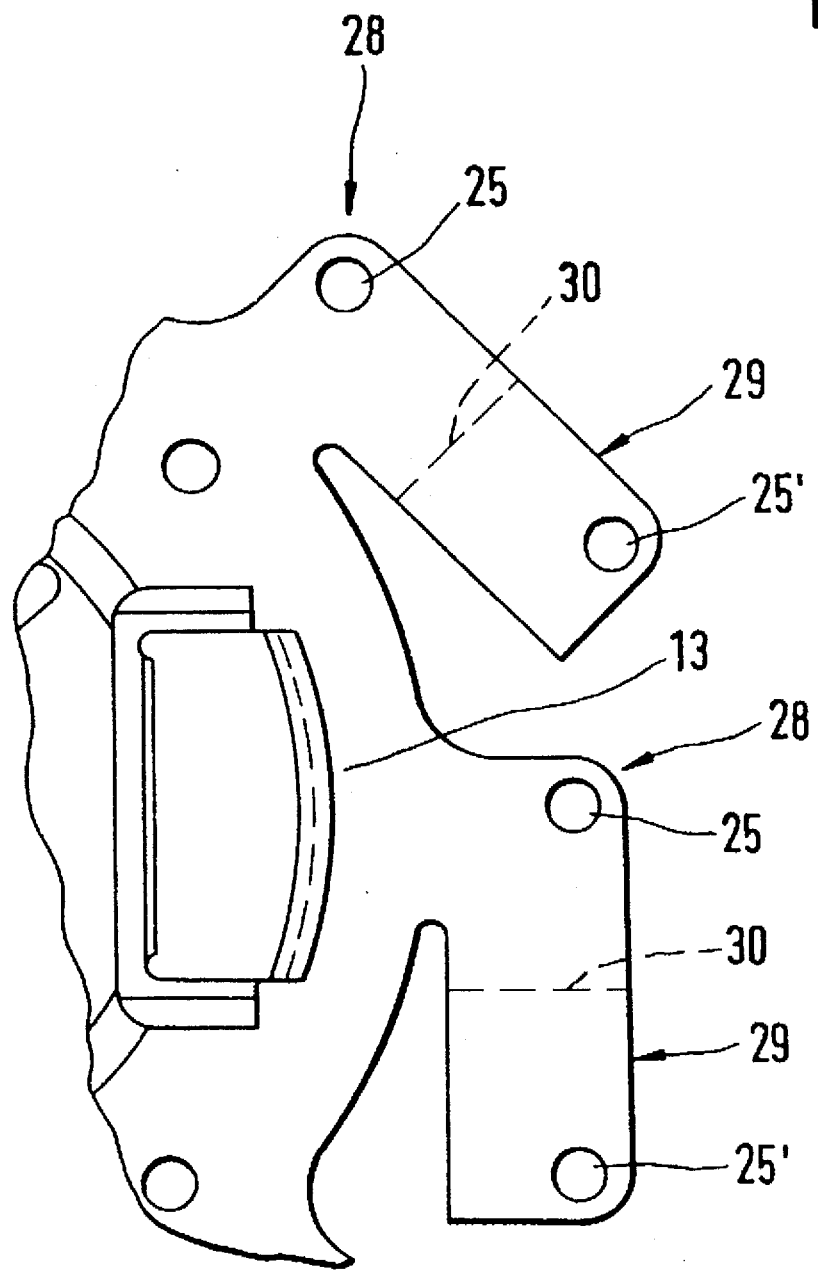
FIG. 4 is a partial view of a carrier in the form of a cover plate.

Additional embodiments of the friction clutch are illustrated in FIGS. 4 to 6A. FIG. 4 shows a partial view of a carrier 13 or cover plate of the torsional damper 12, which cover plate 13 is used simultaneously for the direct fastening of the friction lining ring 16. For this purpose, there are several arms 28 which are distributed on the periphery on the carrier 13, which is in the form of a cover plate. The arms 28 extend radially outward. Each of these arms 28 is provided with a fastening opening 25 for the installation of the rivets 20. The number of arms 28 can preferably correspond to the number of fastening areas 31 of the friction lining ring 16 as shown in FIG. 3. A plurality, and preferably all, of the arms 28 have tabs 29. The tabs 29 extend tangent to the radially extending arms 28 and in a perpendicular direction away from the arms 28. Each tab 29 has an additional fastening opening 25'. The additional fastening opening 25' is perpendicularly offset from the fastening opening 25 of the arms 28, the fastening opening 25 of the arms 28 being located on a radius of the carrier 13. Each of the tabs 29 is bent, at a bending edge 30, for the installation of the friction lining ring 16. The bending edge 30 is located midway between the fastening opening 25 of the arms 28 and the fastening opening 25' of the tabs 29. The bending edge runs or extends essentially perpendicular, to a line extending between the fastening opening 25 of the arms 28 and the fastening opening 25' of the tabs 29. The tabs 29 are engaged with each fastening area 31 of the friction lining ring 16, by means of the areas of the tabs 29, which are ultimately bent approximately in a U-shape.

Figure 5:
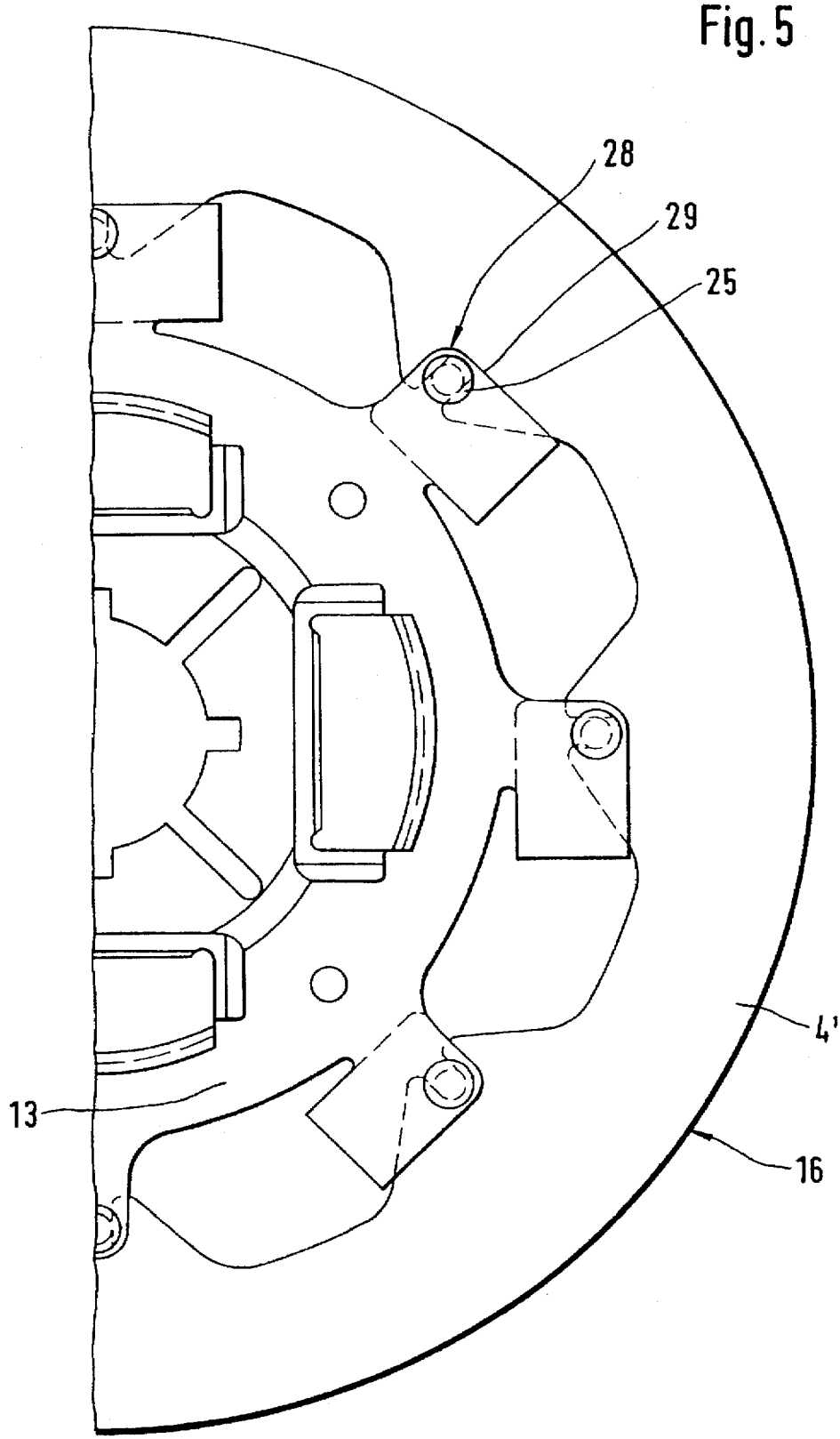
FIG. 5 is a partial view of a clutch disc with a carrier, as illustrated in FIG. 4.
Figure 6:
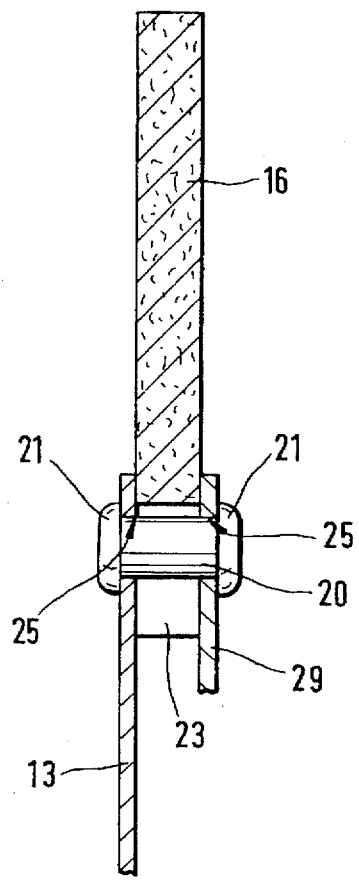
FIG. 6 is a partial section of a clutch disc as illustrated in FIGS. 4 and 5.
Figure 6A:
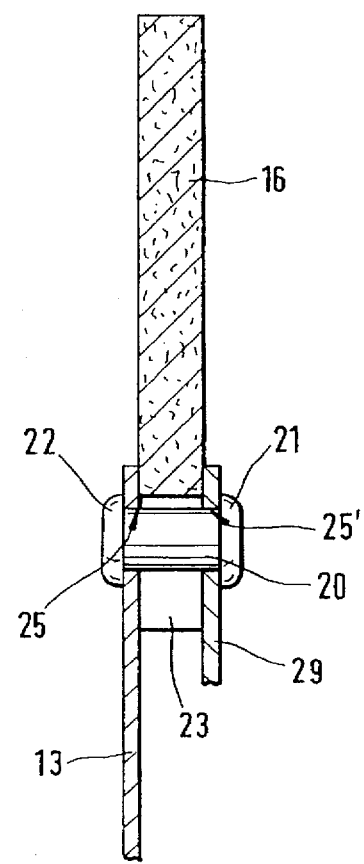
FIG. 6A shows a view similar to that shown in FIG. 6.

After the connection illustrated in FIGS. 5 and 6 has been made, each rivet 20 passes through both the fastening opening 25' in the tab 29 and through the fastening opening 25 in the carrier 13. Thus, the die head 21 of the rivet 20 and closing head 22 of the rivet 20, with the interposition of the material of the carrier 13, create the connection to the friction lining ring 16. An additional embodiment of the present invention is shown in FIG. 6A, which is similar to that shown in FIG. 6. FIG. 6a shows that each rivet 20 passes through both the fastening opening 25' in the tab 29 and through the fastening opening 25 in the carrier 13. Thus, the die head 21 of the rivet 20 and closing head 22 of the rivet 20, with the interposition of the material of the carrier 13, create the connection to the friction lining ring 16.

One feature of the present invention resides broadly in the friction clutch for a motor vehicle, including a centrifugal mass 2 which has a ring-shaped friction surface 4 and is effectively connected to the crankshaft of an internal combustion engine, a clutch housing 5 which is fastened to the centrifugal mass 2, a pressure plate 6 which is fastened in the clutch housing 5 non-rotationally but so that it can move axially, which pressure plate 6 has a ring-shaped surface 7 which essentially axially overlaps or covers the friction surface 4 of the centrifugal mass 2, a membrane or clutch spring 8 to apply an axial force to the pressure plate 6 toward the centrifugal mass 2, with the interposition of a clutch disc 10 with mating friction surfaces 4' and 7', possibly with a torsional damper 12, characterized by the fact that there is a carrier 13 which is non-rotationally connected to the hub 11, which carrier 13 extends radially outward from the hub 11 to shortly before the area of the friction surfaces 4 and 7, that there is also a friction lining ring 16 which has mating friction surfaces 4' and 7' at some distance from one another, which friction lining ring 16 is provided over its entire radial extent or width with an essentially uniform material thickness, and which friction lining ring extends radially inward beyond the friction surfaces 4 and 7, and is in contact laterally in this area with the carrier 13 and is riveted to the carrier 13.

Another feature of the present invention resides broadly in the friction clutch characterized by the fact that the carrier 13 and the friction lining ring 16 have fastening openings 23 and 25, on the same intermediate diameter for rivets 20, and each rivet 20 is in contact by means of its die head 21 on the side of the friction lining ring 16 farther from the carrier 13. Each rivet 20 has a shaft which runs through the fastening openings 23 and 25 of the friction lining ring 16 and the carrier 13, and has its closing head 22 on the side of the carrier 13 farther from the friction lining ring 16.

Yet another feature of the present invention resides broadly in the friction clutch characterized by the fact that the carrier 13 and the friction lining ring 16 have, on the same intermediate diameter, fastening openings 23 and 25 for rivets 20, and each rivet 20 is in contact by means of its die head 21 on the outside of the carrier 13, and each rivet 20 has a shaft which first extends or runs through the fastening opening 25 of the carrier 13 and then extends or runs through the fastening opening 23 of the friction lining ring 16, and the rivet 20 is in contact by means of its closing head 22 on the side of the friction lining ring 16 farther from the carrier 13, with the interposition of a lining disc or an encircling sheet metal ring which has corresponding fastening openings.

A further feature of the present invention resides broadly in the friction clutch characterized by the fact that the pressure plate 6 and the centrifugal mass 2 have recesses 26, 27 in the vicinity of the rivets 20 for the fastening of the friction lining ring 16 and carrier 13, and these recesses 26, 27 make a transition or emerge by means of bevelled portions at an obtuse angle (alpha) into the fraction surface 4 of the centrifugal mass 2 and the friction surface 7 of the pressure plate 6.

Another feature of the present invention resides broadly in the friction clutch characterized by the fact that the friction lining ring 16, on an intermediate diameter, has fastening openings 23 which can be realized in the form of slots which are open radially inward, notches 24 which are located peripherally between the openings 23, the notches 24 extend essentially to the inside diameter of the mating friction surfaces 4' and 7' of the friction lining ring 16, the carrier 13 has arms 28 which correspond to the fastening openings 23 of the friction lining rings 16 and extend radially from a base body, which arms 28 have fastening openings 25 in the form of rivet holes, whereby at least some arms 28 pointing in the tangential direction make a transition into a tab 29, which tab 29 is bent by means of a U-shaped bent edge 30 which runs essentially radially around the fastening area 31 which contains the fastening opening 23 in the friction lining ring 16, and the tab has a second fastening opening 25' for the location of a rivet 20 which also runs through the fastening opening 23 of the friction lining ring 16 and the fastening opening 25 of the carrier 13.

In one embodiment of the present invention, the fastening openings in the friction lining ring are realized in the form of radial slots. The tolerances required when fastening the friction lining ring through slots are often much less demanding than those which are permissible for holes. A slot provides adjustment freedom in two directions, radially in and out, while a circular rivet hole allows for a minimal variation of size. The reduced tolerance requirement enables a simple and less costly manufacturing process to be employed. In addition, improved balancing of the clutch disc is provided through the use of fastening openings in the form of slots. The slots enable a greater degree of freedom in fastening when compared to a hole, The use of slots may also enable the balancing of the clutch disc to be simplified since there is a greater allowance for adjustment.

The mass moment of inertia of the clutch disc may also be reduced. In this context, the fastening means of the friction lining ring are located closer to the axis of rotation than in conventional friction lining rings. The fastening means for the friction lining rings, in the form of rivets, are generally more dense and therefore heavier than the friction lining ring material. The relocation of the heavier rivets closer to the axis of rotation may provide a reduction of the power required to accelerate the disc when the clutch is engaged. Therefore, the relocation of the denser rivets, closer to the axis of rotation, may reduce the mass moment of inertia and also provide for smoother starts. The clutch disc may also be better balanced as a result of this configuration.

Examples of clutches and components therefore which may be utilized in accordance with the present invention may be found in the following documents: U.S. patent application Ser. No. 08/221,372 filed on Mar. 31, 1994 entitled "FLYWHEEL & CLUTCH SYSTEM", having inventors Bernhard SCHIERLING and Hilmar GOBEL, issued as U.S. Pat. No. 5,476,166 on Dec. 19, 1995, which corresponds to Federal Republic of Germany patent application P 43 11 102, filed on Apr. 3, 1993, which corresponds to DE-OS 43 11 102 and DE-PS 43 11 102; U.S. patent application Ser. No. 08/360,455 filed on Dec. 21, 1994 entitled "FRICTION CLUTCH FOR A MOTOR VEHICLE", having inventor Harald JEPPE, which corresponds to Federal Republic of Germany patent application P 43 44 124, filed on Dec. 23, 1993, which corresponds to DE-OS 43 44 124 and DE-PS 43 44 124; U.S. patent application Ser. No. 08/405,139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE", having inventors Jens SCHNEIDER and Harald JEPPE, which corresponds to Federal Republic of Germany patent application No. P 44 09 253, filed on Mar. 18, 1994, which corresponds to DE-OS 44 09 253 and DE-PS 44 09 253; U.S. patent application Ser. No. 08/438,709 filed on May 11, 1995 entitled "CLUTCH ASSEMBLY FOR A MOTOR VEHICLE HAVING A FLEXIBLE CLUTCH DISC", having inventors Joachim LINDNER, Jorg SUDAU, and Bernhard SCHIERLING, which corresponds to Federal Republic of Germany patent application No. P 44 16 949, filed on May 13, 1994, which corresponds to DE-OS 44 16 949 and DE-PS 44 16 949; U.S. patent application Ser. No. 08/499, 305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & HUB" having inventors Klaus MEMMEL, Gunter WAWRZIK, Winfried STURMER, and Harald JEPPE, which corresponds to Federal Republic of Germany patent application No. P 44 24 186, filed on Jul. 8, 1994, which corresponds to DE-OS 44 24 186 and DE-PS 44 24 186; U.S. patent application Ser. No. 08/502,401 filed on Jul. 14, 1995 entitled "A TRANSMISSION OF AN INTERNAL COMBUSTION ENGINE WITH A CLUTCH WITH A TWO-MASS FLYWHEEL", having inventors Michael WEISS, Jorg SUDAU, Bernhard SCHIERLING, Thomas WIRTH, Jurgen KLEIFGES, Reinhard FELDHAUS, Andreas ORLAMUNDER, and Eberhard KNAUPP, which corresponds to Federal Republic of Germany patent application No. P 195 19 363, filed on May 26, 1995, which corresponds to DE-OS 195 19 363 and DE-PS 195 19 363; U.S. patent application Ser. No. 08/504,848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES", having inventors Bernhard SCHIERLING, Rudolf BAUERLEIN, Cora CARLSON, and Hilmar GOBEL, which corresponds to Federal Republic of Germany patent application No. P 44 25 570, filed on Jul. 20, 1994, which corresponds to DE-OS 44 25 570 and DE-PS 44 25 570; U.S. patent application Ser. No. 08/515,263 filed on Aug. 15, 1993 entitled "A FLYWHEEL FOR THE FRICTION CLUTCH OF A MOTOR VEHICLE, THE FLYWHEEL HAVING TWO CENTRIFUGAL MASSES & A FRICTION DEVICE", having inventors Joachim LINDNER and Bernhard SCHIERLING, which corresponds to Federal Republic of Germany patent application No. P 44 28 832, filed on Aug. 17, 1994, which corresponds to DE-OS 44 28 832 and DE-PS 44 28 832; U.S. patent application Ser. No. 08/515,348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH", having inventors Joachim LINDNER and Bernhard SCHIERLING, which corresponds to Federal Republic of Germany patent application No. P 44 28 829, filed on Aug. 17, 1994, which corresponds to DE-OS 44 28 829 and DE-PS 44 28 829; and U.S. patent application Ser. No. 08/518,789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC", having inventors Klaus MEMMEL, Jurgen KLEIFGES, Reinhard FELDHAUS, and Harald JEPPE, which corresponds to Federal Republic of Germany patent application No. P 44 29 870, filed on Aug. 23, 1994, which corresponds to DE-OS 44 29 870 and DE-PS 44 29 870. These patents and patent applications and their corresponding published patent applications, as well as their published equivalents, are hereby incorporated by reference as if set forth in their entirety herein. All of the above U.S. patent documents in this paragraph are assigned to Fichtel & Sachs AG of the Federal Republic of Germany.

Types of transmissions in which the present invention may be incorporated may be disclosed in the following U.S. Patents: U.S. Pat. No. 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies in which the present invention may be utilized may be disclosed in the following U.S. Patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels in which the present invention may be utilized may be disclosed in the following U.S. Patents: U.S. Pat. No. 5,103,688 to Kuhne on Apr. 14, 1992, entitled "Two-mass Flywheel"; U.S. Pat. No. 4,777,843 to Bopp on Oct. 18, 1988, entitled "Two-mass Flywheel Assembly with Viscous Damping Assembly"; U.S. Pat. No. 5,195,396 to Kamiya et al. on Mar. 23, 1993, entitled "Torque Variation Absorbing Device"; and U.S. Pat. No. 4,946,420 to Jackel on Aug. 7, 1990, entitled "Apparatus for Damping Torsional Vibrations".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments my be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 14 808.8, filed on Apr. 21, 1995, having inventors Heiko Schulz-Andres and Achim Link, and DE-OS 195 14 808.8 and DE-PS 195 14 808.8, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a flywheel, said flywheel having an axis of rotation defining an axial direction parallel to the axis of rotation;

said flywheel comprising a ring-shaped friction surface;

said flywheel friction surface having an inner radius and an outer radius;

a clutch housing;

a clutch disc;

a pressure plate for engaging and disengaging said clutch disc with said flywheel;

said pressure plate comprising a ring-shaped friction surface;

said pressure plate friction surface having an inner radius and an outer radius;

said clutch disc being disposed between said flywheel and said pressure plate;

means for fastening said pressure plate to said clutch housing;

means for engaging said pressure plate and said flywheel with said clutch disc;

said clutch disc comprising:
a hub;
a friction lining ring;
carrier means for connecting said friction lining ring to one of said hub and a torsional damper disposed at said hub;
said friction lining ring comprising a first portion;
said first portion having a first friction surface;
said friction lining ring comprising a second portion adjacent to said first friction surface;
said first friction surface having an annular shape;
said first friction surface having an inner radius and an outer radius;
said inner radius of said first friction surface being adjacent to said inner radius of said flywheel friction surface;
said outer radius of said first friction surface being adjacent to said outer radius of said flywheel friction surface;
said first friction surface being substantially in contact with said flywheel friction surface upon engagement of said clutch disc;
said friction lining ring comprising a third portion;
said third portion having a second friction surface;
said second portion also being adjacent to said second friction surface;
said second friction surface having an annular shape;
said second friction surface having an inner radius and an outer radius;
said inner radius of said second friction surface being adjacent to said inner radius of said pressure plate friction surface;
said outer radius of said second friction surface being adjacent to said outer radius of said pressure plate friction surface;
said second friction surface being substantially in contact with said pressure plate friction surface upon engagement of said clutch disc;
means for connecting said friction lining ring to said carrier means;
said carrier means comprising an inner part and an outer part;
said outer part of said carrier means being disposed at a substantially greater distance from the axis of rotation than said inner part of said carrier means;
said outer part of said carrier means extending radially outwardly from said hub to shortly before at least one of: said first friction surface of said friction lining ring and said second friction surface of said friction lining ring;
said outer radius of said flywheel friction surface being substantially greater than said inner radius of said flywheel friction surface;
said outer radius of said pressure plate friction surface being substantially greater than said inner radius of said pressure plate friction surface;
said outer radius of said first friction surface being substantially greater than said inner radius of said first friction surface; and
said outer radius of said second friction surface being substantially greater than said inner radius of said second friction surface;

said pressure plate comprising a first surface;
said first surface of said pressure plate being disposed adjacent to said inner radius of said pressure plate friction surface;
said first surface of said pressure plate being concentric with respect to the axis of rotation;
said first surface of said pressure plate being disposed to intersect said friction lining ring at an obtuse angle with respect to said pressure plate friction surface to thereby provide for a non-sticking release of said pressure plate from said friction lining ring, upon wear of said friction lining ring;
said first surface of said pressure plate being angled in a direction away from said friction lining ring and having a first length dimension; and the first length dimension of said first surface of said pressure plate being sufficiently large to provide axial and radial clearance for said means for connecting.

2. Friction clutch as claimed in claim 1, wherein:

said flywheel comprises a second surface;

said second surface of said flywheel being disposed adjacent to said inner radius of said flywheel friction surface;

said second surface of said flywheel being concentric with respect to the axis of rotation;

said second surface of said flywheel being disposed to intersect said friction lining ring at an obtuse angle with respect to said flywheel friction surface to thereby provide for a non-sticking release of said flywheel from said friction lining ring, upon wear of said friction lining ring;

said second surface of said flywheel being angled in a direction away from said friction lining ring and having a second length dimension; and the second length dimension of said second surface of said flywheel being sufficiently large to provide axial and radial clearance for said means for connecting.

3. Friction clutch as claimed in claim 2, wherein:

said second friction surface being disposed opposite to said first friction surface;

said friction lining ring having a thickness defined between said first friction surface and said second friction surface of said friction lining ring;

said thickness of said friction lining ring being essentially constant between said first friction surface of said friction lining ring and said second friction surface of said friction lining ring;

said friction lining ring having an innermost radial extent and an outermost radial extent;

said friction lining ring having a radial width defined between the innermost radial extent of said friction lining ring and the outermost radial extent of said friction lining ring; and said constant thickness extending across the entire radial width of said friction lining ring.

4. Friction clutch as claimed in claim 2, wherein:

said outer part of said carrier means being adjacent to said second portion of said friction lining ring;

said friction lining ring being connected to said outer part of said carrier means at said second portion of said fraction lining ring; and said inner part of said carrier means being attached to said hub.

5. Friction clutch as claimed in claim 4, wherein:

said second portion of said friction lining ring being disposed radially inside said inner radius of said first friction surface;

said second portion of said friction lining ring also being disposed radially inside said inner radius of said second friction surface;

said second portion of said friction lining ring comprises a plurality of fastening areas;

each of said fastening areas of said friction lining ring comprises at least one fastening opening; and each of said fastening openings of said friction lining ring being disposed circumferentially around said second portion of said friction lining ring.

6. Friction clutch as claimed in claim 5, wherein:

said outer part of said carrier means comprises a plurality of fastening openings;

each of said fastening openings of said carrier means being disposed circumferentially around said outer part of said carrier means;

each of said fastening openings of said carrier means being circumferentially aligned with a corresponding one of said fastening openings of said friction lining ring;

said means for connecting comprises a plurality of rivets; and said rivets being disposed to connect each of said fastening openings of said friction lining ring to each of said corresponding fastening openings of said carrier means.

7. Friction clutch as claimed in claim 6, wherein:

said clutch disc has an intermediate radius, defined as having a center point on the the axis of rotation and an outer point substantially short of each of: said first friction surface of said friction lining ring and said second friction surface of said friction lining ring;

each of said fastening openings of said carrier means being disposed at the intermediate radius with respect to the axis of rotation;

each of said fastening openings of said friction lining ring being disposed at the same intermediate radius with respect to the axis of rotation, as each of said fastening openings of said carrier means;

each of said fastening areas of said friction lining ring comprises a first side and a second side disposed opposite said first side;

said first side of each of said fastening areas of said friction lining ring being essentially parallel to said first friction surface of said friction lining ring;

said second side of each of said fastening areas of said friction lining ring being essentially parallel to said second friction surface of said friction lining ring;

said outer part of said carrier means comprises a third side and a fourth side .disposed opposite said third side;

said third side of said outer part of said carrier means being disposed adjacent to said first side of each of said fastening areas;

each of said rivets comprises a shank having a longitudinal axis;

said shank comprises a first end and a second end disposed an axial distance away from said first end;

said first end of said shank comprises a die head;

said second end of said shank comprises a closing head;

said shank of said rivets being disposed to pass through said fastening openings of said friction lining ring at the intermediate radius;

said shank of said rivets also being disposed to pass through each of said corresponding fastening openings of said carrier means at the intermediate radius;

said die head of said shank of said rivets being located on said second side of said fastening areas of said fraction lining ring, farther away from said fourth side of said outer part of said carrier means;

said die head of said shank of said rivets being configured to attach said friction lining ring to said carrier means; and said closing head of said shank of said rivets being located on said fourth side of said outer part of said carrier means, farther away from said second side of said fastening areas of said friction lining rang.

8. Friction clutch as claimed in claim 7, wherein:

each of said fastening openings of said friction lining ring comprises a slot; and each of said slots of said friction lining ring being disposed to open toward the radial inside of said friction lining ring.

9. Friction clutch as claimed in claim 5, wherein:

said clutch disc has an intermediate radius, defined as having a center point on the the axis of rotation and an outer point substantially short of each of: said first friction surface of said friction lining ring and said second friction surface of said friction lining ring;

each of said fastening openings of said friction lining ring being disposed at the intermediate radius with respect to the axis of rotation;

each of said fastening openings of said friction lining ring comprises a slot;

each of said slots of said friction lining ring being disposed to open toward the radial inside of said friction lining ring;

said second portion of said friction lining ring also comprises a plurality of notches;

each of said notches being disposed both circumferentially between, and peripherally offset from, each of said fastening areas of said friction lining ring;

each of said notches extend essentially outward toward both said inner radius of said first friction surface of said friction lining ring, and said inner radius of said second friction surface of said friction lining ring;

each of said fastening areas of said friction lining ring comprises a first side and a second side disposed opposite said first side;

said first side of each of said fastening areas of said friction lining ring being essentially parallel to said first friction surface of said friction lining ring; and said second side of each of said fastening areas of said friction lining ring being essentially parallel to said second friction surface of said friction lining ring.

10. Friction clutch as claimed in claim 9, wherein:

said outer part of said carrier means comprises a plurality of arms;

each of said arms is disposed circumferentially around said outer part of said carrier means;

each of said arms extends radially outwardly from said outer part of said carrier means;

each of said arms is aligned with a corresponding one of said fastening areas of said friction lining ring;

each of said arms comprises at least one fastening opening;

each of said fastening openings of said arms is circumferentially aligned with a corresponding one of said fastening openings of said friction lining ring;

at least one of said arms further comprises a U-shaped tab;

said U-shaped tab extends tangentially to said arm and in a substantially perpendicular direction away from said arm;

said U-shaped tab is configured to provide a U-shaped opening between the opposing sides of the U-shaped tab;

said U-shaped opening of said U-shaped tab provides means for surroundingly connecting said fastening areas of said friction lining ring to said outer part of said carrier means;

said U-shaped tab also comprises a second fastening opening opposite to and aligned with a corresponding one of said fastening openings of said corresponding arm;

said fastening areas of said friction lining ring are sandwiched within said U-shaped openings of said U-shaped tab;

said fastening openings of said fastening areas of said friction lining ring are aligned with both said fastening openings of said arm and said second fastening opening of said U-shaped tab;

said means for connecting comprises a plurality of rivets; and said rivets are disposed to connect each of said fastening openings of said friction lining ring with a corresponding one of said fastening openings of said arm and a corresponding one of said second fastening openings of said U-shaped tab.

11. Friction clutch as claimed in claim 10, wherein:

each of said fastening openings of said arms comprises a rivet hole; and each of said second fastening openings of said U-shaped tab comprises a rivet hole.

12. A friction clutch for a motor vehicle, said friction clutch comprising:

a flywheel, said flywheel having an axis of rotation defining an axial direction parallel to the axis of rotation;

said flywheel comprising a ring-shaped friction surface;

said flywheel friction surface having an inner radius and an outer radius;

a clutch housing;

a clutch disc;

a pressure plate for engaging and disengaging said clutch disc with said flywheel;

said pressure plate comprising a ring-shaped friction surface;

said pressure plate friction surface having an inner radius and an outer radius;

said clutch disc being disposed between said flywheel and said pressure plate;

means for fastening said pressure plate to said clutch housing;

means for engaging said pressure plate and said flywheel with said clutch disc;

said clutch disc comprising:

a hub;

a friction lining ring;

carrier means for connecting said friction lining ring to one of said hub and a torsional damper disposed at said hub;

said friction lining ring comprising a first portion;

said first portion having a first friction surface;

said friction lining ring comprising a second portion adjacent to said first friction surface;

said first friction surface having an annular shape;

said first friction surface having an inner radius and an outer radius;

said inner radius of said first friction surface being adjacent to said inner radius of said flywheel friction surface;

said outer radius of said first friction surface being adjacent to said outer radius of said flywheel friction surface;

said first friction surface being substantially in contact with said flywheel friction surface upon engagement of said clutch disc;

said friction lining ring comprising a third portion; said third portion having a second friction surface;

said second portion also being adjacent to said second friction surface;

said second friction surface having an annular shape;

said second friction surface having an inner radius and an outer radius;

said inner radius of said second friction surface being adjacent to said inner radius of said pressure plate;

said outer radius of said second friction surface being adjacent to said outer radius of said pressure plate;

said second friction surface being substantially in contact with said pressure plate friction surface upon engagement of said clutch disc;

means for connecting said friction lining ring to said carrier means;

said carrier means comprising an inner part and an outer part;

said outer part of said carrier means being disposed at a substantially greater distance from the axis of rotation than said inner part of said carrier means;

said outer part of said carrier means extending radially outwardly from said hub to shortly before at least one of: said first friction surface of said friction lining ring and said second friction surface of said friction lining ring;

said outer radius of said flywheel friction surface being substantially greater than said inner radius of said flywheel friction surface;

said outer radius of said pressure plate friction surface being substantially greater than said inner radius of said pressure plate friction surface;

said outer radius of said first friction surface being substantially greater than said inner radius of said first friction surface; and said outer radius of said second friction surface being substantially greater than said inner radius of said second friction surface;

said outer part of said carrier means comprising a plurality of arms;

said friction lining ring comprising a plurality of fastening areas;

each of said fastening areas of said friction lining ring comprising at least one fastening opening;

each of said fastening openings of said friction lining ring being disposed circumferentially around said second portion of said friction lining ring;

each of said plurality of arms being disposed circumferentially around said outer part of said carrier means;

each of said plurality of arms extending radially outwardly from said outer part of said carrier means;

each of said plurality of arms being aligned with a corresponding one of said fastening areas of said friction lining ring;

each of said plurality of arms comprising at least one fastening opening;

each of said fastening openings of said plurality of arms being circumferentially aligned with a corresponding one of said fastening openings of said friction lining ring;

at least one of said plurality of arms further comprising a U-shaped tab;

said U-shaped tab extending tangent to said arm and in a substantially perpendicular direction away from said arm;

said U-shaped tab being configured to provide a U-shaped opening between the opposing sides of the U-shaped tab;

said U-shaped opening of said U-shaped tab providing means for surroundingly connecting said fastening areas of said friction lining ring to said outer part of said carrier means;

said U-shaped tab also comprising a second fastening opening opposite to and aligned with a corresponding one of said fastening openings of said corresponding arm;

said fastening areas of said friction lining ring being sandwiched within said U-shaped opening of said U-shaped tab;

said fastening openings of said fastening areas of said friction lining ring being aligned with both said fastening openings of said plurality of arms and said second fastening opening of said U-shaped tab;

said means for connecting comprising a plurality of rivets; and said plurality of rivets being disposed to connect each of said fastening openings of said friction lining ring with a corresponding one of said fastening openings of said plurality of arms and a corresponding one of said second fastening opening of said U-shaped tab.

13. Friction clutch as claimed in claim 12, wherein:

each of said fastening openings of said arms comprise a rivet hole; and each of said second fastening openings of said U-shaped tab comprise a rivet hole.

14. Friction clutch as claimed in claim 13, wherein:

said second friction surface is disposed opposite to said first friction surface;

said friction lining ring has a thickness defined between said first friction surface and said second friction surface of said friction lining ring;

said thickness of said friction lining ring is essentially constant between said first friction surface of said friction lining ring and said second friction surface of said friction lining ring;

said friction lining ring has an innermost radial extent and an outermost radial extent;

said friction lining ring has a radial width defined between the innermost radial extent of said friction lining ring and the outermost radial extent of said friction lining ring; and said constant thickness extends across the entire radial width of said friction lining ring.

15. Friction clutch as claimed in claim 14, wherein:

said outer part of said carrier means is adjacent to said second portion of said friction lining ring;

said friction lining ring is connected to said outer part of said carrier means at said second portion of said friction lining ring; and said inner part of said carrier means is attached to said hub.

16. Friction clutch as claimed in claim 15, wherein:

said second portion of said friction lining ring is disposed radially inside said inner radius of said first friction surface; and said second portion of said friction lining ring also is disposed radially inside said inner radius of said second friction surface.

17. Friction clutch as claimed in claim 16, wherein:

said pressure plate comprises a first surface;

said first surface is disposed adjacent to said inner radius of said pressure plate friction surface;

said first surface is concentric with respect to the axis of rotation;

said first surface is disposed to intersect said friction lining ring at an obtuse angle with respect to said pressure plate friction surface to thereby provide for a non-sticking release of said pressure plate from said friction lining ring, upon wear of said friction lining ring;

said first surface is angled in a direction away from said friction lining ring and having a first length dimension; and the first length dimension of said first surface is sufficiently large to provide axial and radial clearance for said means for connecting.

18. Friction clutch as claimed in claim 17, wherein:

said flywheel comprises a second surface;

said second surface is disposed adjacent to said inner radius of said flywheel friction surface;

said second surface is concentric with respect to the axis of rotation;

said second surface is disposed to intersect said friction lining ring at an obtuse angle with respect to said flywheel friction surface to thereby provide for a non-sticking release of said flywheel from said friction lining ring, upon wear of said friction lining ring;

said second surface is angled in a direction away from said friction lining ring and having a second length dimension; and the second length dimension of said second surface is sufficiently large to provide axial and radial clearance for said means for connecting.

19. A friction clutch for a motor vehicle comprising:

a flywheel, said flywheel having an axis of rotation defining an axial direction parallel to the axis of rotation;

said flywheel comprising a ring-shaped friction surface;

said flywheel friction surface having an inner radius and an outer radius;

a clutch housing;

a clutch disc;

a pressure plate for engaging and disengaging said clutch disc with said flywheel;

said pressure plate comprising a ring-shaped friction surface;

said pressure plate friction surface having an inner radius and an outer radius;

said clutch disc being disposed between said flywheel and said pressure plate;

an apparatus to fasten said pressure plate to said clutch housing;

an apparatus to engage said pressure plate and said flywheel with said clutch disc;

said clutch disc comprising:
a hub;
a friction lining ring;
a carrier to connect said friction lining ring to one of said hub and a torsional damper disposed at said hub;
said friction lining ring comprising a first portion; said first portion having a first friction surface;
said friction lining ring comprising a second portion adjacent to said first friction surface;
said first friction surface having an annular shape;
said first friction surface having an inner radius and an outer radius;
said inner radius of said first friction surface being adjacent to said inner radius of said flywheel friction surface;
said outer radius of said first friction surface being adjacent to said outer radius of said flywheel friction surface;
said first friction surface being substantially in contact with said flywheel friction surface upon engagement of said clutch disc;
said friction lining ring comprising a third portion;
said third portion having a second friction surface;
said second portion also being adjacent to said second friction surface;
said second friction surface having an annular shape;
said second friction surface having an inner radius and an outer radius;
said inner radius of said second friction surface being adjacent to said inner radius of said pressure plate friction surface;
said outer radius of said second friction surface being adjacent to said outer radius of said pressure plate friction surface;
said second friction surface being substantially in contact with said pressure plate friction surface upon engagement of said clutch disc;
an apparatus to connect said friction lining ring to said carrier;
said carrier comprising an inner part and an outer part;
said outer part of said carrier being disposed at a substantially greater distance from the axis of rotation than said inner part of said carrier;
said outer part of said carrier extending radially outwardly from said hub to shortly before at least one of: said first friction surface of said friction lining ring and said second friction surface of said friction lining ring;
said outer radius of said flywheel friction surface being substantially greater than said inner radius of said flywheel friction surface;
said outer radius of said pressure plate friction surface being substantially greater than said inner radius of said pressure plate friction surface;
said outer radius of said first friction surface being substantially greater than said inner radius of said first friction surface; and
said outer radius of said second friction surface being substantially greater than said inner radius of said second friction surface;

said pressure plate comprising a first surface;
said first surface of said pressure plate being disposed adjacent to said inner radius of said pressure plate friction surface;
said first surface of said pressure plate being concentric with respect to the axis of rotation;
said first surface of said pressure plate being disposed at an obtuse angle with respect to said pressure plate friction surface to thereby provide for a non-sticking release of said pressure plate from said friction lining ring, upon wear of said friction lining ring;
said first surface of said pressure plate being disposed to make contact with said friction lining ring upon wear of said friction lining ring caused by contact of said friction lining ring with said pressure plate friction surface upon engagement and disengagement of said clutch;

said first surface of said pressure plate being angled in a direction away from said friction lining ring and having a first length dimension;

the first length dimension of said first surface of said pressure plate being sufficiently large to provide axial and radial clearance for said apparatus to connect;

said flywheel comprises a second surface;

said second surface of said flywheel being disposed adjacent to said inner radius of said flywheel friction surface;

said second surface of said flywheel being concentric with respect to the axis of rotation;

said second surface of said flywheel being disposed at an obtuse angle with respect to said flywheel friction surface to thereby provide for a non-sticking release of said flywheel from said friction lining ring, upon wear of said friction lining ring;

said second surface of said flywheel being disposed to make contact with said friction lining ring upon wear of said friction lining ring caused by contact of said friction lining ring with said ring shaped friction surface of said flywheel upon engagement and disengagement of said clutch;

said second surface of said flywheel being angled in a direction away from said friction lining ring and having a second length dimension; and the second length dimension of said second surface of said flywheel being sufficiently large to provide axial and radial clearance for said apparatus to connect.

* * * * *

UNITED STATES PATENT AND TRADEMARK OFFICE
CERTIFICATE OF CORRECTION

PATENT NO. : 5,720,373

DATED : February 24, 1998

INVENTOR(S) : Heiko SCHULZ-ANDRES and Achim LINK

It is certified that error appears in the above-identified patent and that said Letters Patent is hereby corrected as shown below:

On the title page, item [56], under the FOREIGN PATENT DOCUMENTS section, after '0542434', delete "8/1992" and insert --8/1922--.

On the title page, item [57], line 4 under the ABSTRACT section, after 'lining', delete "rang" and insert --ring--.

In column 4, line 36, after 'flywheel', delete "end" and insert --and--.

In column 5, line 63, after 'and', delete "7!" and insert --7'--.

In column 7, line 44, after the second occurrence of 'FIG.', delete "6a" and insert --6A--.

UNITED STATES PATENT AND TRADEMARK OFFICE
CERTIFICATE OF CORRECTION

PATENT NO.  :  5,720,373
DATED       :  February 24, 1998
INVENTOR(S) :  Heiko SCHULZ-ANDRES and Achim LINK It is certified that error appears in the above-identified patent and that said Letters Patent is hereby corrected as shown below:

In column 10, line 17, after '15,', delete "1993" and insert --1995--.

In column 11, line 16, after 'embodiments', delete "my" and insert --may--.

Signed and Sealed this

First Day of September, 1998

*Attest:*

BRUCE LEHMAN

*Attesting Officer*

*Commissioner of Patents and Trademarks*